(12) United States Patent
Coron et al.

(10) Patent No.: US 7,218,735 B2
(45) Date of Patent: May 15, 2007

(54) CRYPTOGRAPHY METHOD ON ELLIPTIC CURVES

(75) Inventors: Jean-Sebastien Coron, Paris (FR); Christophe Tymen, Versailles (FR)

(73) Assignee: Gemplus, Gemenos (FR)

( * ) Notice: Subject to any disclaimer, the term of this patent is extended or adjusted under 35 U.S.C. 154(b) by 743 days.

(21) Appl. No.: 10/257,129

(22) PCT Filed: Apr. 18, 2001

(86) PCT No.: PCT/FR01/01195

§ 371 (c)(1),
(2), (4) Date: Apr. 3, 2003

(87) PCT Pub. No.: WO01/80481

PCT Pub. Date: Oct. 25, 2001

(65) Prior Publication Data

US 2003/0152218 A1    Aug. 14, 2003

(30) Foreign Application Priority Data

Apr. 18, 2000 (FR) .................................. 00 05006

(51) Int. Cl.
*H04K 1/00* (2006.01)
*H04L 9/00* (2006.01)
(52) U.S. Cl. .................... 380/30; 713/180; 713/171
(58) Field of Classification Search ............... 380/30
See application file for complete search history.

(56) References Cited

U.S. PATENT DOCUMENTS

| | | | | |
|---|---|---|---|---|
| 5,854,759 | A | * | 12/1998 | Kaliski et al. ............... 708/492 |
| 5,999,626 | A | * | 12/1999 | Mullin et al. ................ 713/172 |
| 6,925,564 | B1 | * | 8/2005 | Mullin et al. ................ 713/180 |
| 2001/0002486 | A1 | * | 5/2001 | Kocher et al. ............... 713/171 |
| 2002/0044649 | A1 | * | 4/2002 | Gallant et al. ................. 380/30 |
| 2002/0095583 | A1 | * | 7/2002 | Vanstone et al. ........... 713/180 |
| 2005/0039023 | A1 | * | 2/2005 | Vanstone et al. ........... 713/180 |

OTHER PUBLICATIONS

Solinas, J.A., *An Improved Algorithm for Arithmetic on a Family of Elliptic Curves*, Proceedings of Crypto 1997, pp. 357-371.

* cited by examiner

*Primary Examiner*—Christopher Revak
*Assistant Examiner*—Arezoo Sherkat
(74) *Attorney, Agent, or Firm*—Buchanan Ingersoll & Rooney PC

(57) ABSTRACT

A cryptography method for generating probabilistic digital signatures and/or for a key-exchange a protocol and/or for an encryption algorithm is based on the use of a public key algorithm on abnormal binary elliptic curve, such as a Koblitz curve. A point P (x, y) is selected, and pairs $(k_i, P_i)$ are stored with $P_i$ being the point corresponding to the scalar multiplication of the point P by $k_i$. A random variable (k) is generated and a point C is calculated that corresponds to the scalar multiplication of P by k. The generation of the random variable (k) and the calculation of the point C are performed simultaneously.

19 Claims, No Drawings

CRYPTOGRAPHY METHOD ON ELLIPTIC CURVES

This disclosure is based upon French Application No. 00/05006, filed on Apr. 18, 2000 and International Application No. PCT/FR01/01195, filed Apr. 18, 2001, the contents of which are incorporated herein by reference.

BACKGROUND OF THE INVENTION

The present invention relates to a cryptography method on elliptic curve. Such a method is based on the use of a public key algorithm and can be applied to the generation of probabilistic digital signals of a message and/or to a key exchange protocol and/or to a message enciphering algorithm.

An algorithm for generating and verifying digital signatures consists in calculating one or more integers, in general a pair, known as the signature, and associated with a given message in order to certify the identity of a signature and the integrity of the signed message. The signature is said to be probabilistic when the algorithm uses a random variable in the generation of the signature, this random variable being secret and regenerated at each new signature. Thus the same message transmitted by the same user may have several distinct signatures.

Key exchange protocol and enciphering algorithms also use a secret random variable k generated at each new application of the algorithm.

Public key cryptography algorithms on elliptic curves are being used more and more. Such an algorithm is based on the use of points $P(x,y)$ on a curve E satisfying the equation:

$y^2 + xy = x^3 + ax^2 + b$, with $a$ and $b$ two elements of a finite field.

Addition or subtraction operations are performed on the points P of the curve E. The operation consisting in adding k times the same point P is called the scalar multiplication of P by k, and corresponds to a point C on the elliptic curve defined by $C(x',y') = k \cdot P(x,y)$.

An example of such an algorithm can be illustrated by the ECDSA (from the English Elliptic Curve Digital Standard Algorithm), which is an algorithm for generating and verifying probabilistic digital signatures.

The parameters of the ECDSA are:

E, an elliptic curve defined on the set $Z_p$, the number of points on the curve E being divisible by a large prime number N, in general $N > 2^{160}$, $P(x,y)$, a given point on the elliptic curve E.

The secret key d is a randomly fixed number between 0 and N−1, and the public key Q is related to d by the scalar multiplication equation $Q(x_1, y_1) = d \cdot P(x,y)$.

Let m be the message to be sent. The ECDSA signature of m is the pair of integers (r,s) included in the range [1, N−1] and defined as follows:

let k be a random number chosen in the range [1, N−1], k being a random variable regenerated at each signature;

calculation of the point C obtained by the scalar multiplication $C(x',y') = k \cdot P(x,y)$;

$r = x' \mod N$;

$s = k^{-1}(h(m) + d \cdot r) \mod N$;

with h(m) the result of the application of a hash function h, which is a pseudo-random cryptographic function, to the initial message m.

The verification of the signature is performed, using public parameters (E, P, N, Q), as follows:

Intermediate calculations are carried out:

$w = s^{-1} \mod N$;
$u_1 = h(m) \cdot w \mod N$;
$u_2 = r \cdot w \mod N$;

An addition and scalar multiplication operation is performed by calculating the point on the curve E corresponding to $u_1 P + u_2 Q = (x_0, y_0)$ It is checked whether $v = x_0 \mod N$ Y r.

If this equality is true, the signature is authentic.

The generation of the signature (r,s) was performed with the secret key d and a secret random number k different for each signature, and its verification with the parameters of the public key. Thus anyone can authenticate a card and its bearer without holding its secret key.

The cost of execution of such a signature algorithm on elliptic curve is directly related to the complexity and speed of the scalar modification operation for defining the point $C = k \cdot P$.

Improvements to the cryptography method on elliptic curves have been developed in order to facilitate and accelerate this scalar multiplication operation. In particular, the article by J. A. Solinas "An Improved Algorithm for Arithmetic on a Family of Elliptic Curves", which appeared in Proceedings of Crypto'97, Springer Verlag, describes one possible improvement.

In order to accelerate the method for calculating a scalar multiplication in the context of an algorithm on elliptic curve E, it has thus been envisaged working on a particular family of elliptic curves, known as abnormal binary elliptic curves or Koblitz curves, on which a particular operator is available, known as a Frobenius operator, making it possible to calculate the scalar multiplication operations more quickly.

The Koblitz curves are defined on the mathematical set $GF(2^n)$ by the equation:

$y^2 + xy = x^3 + ax^2 + 1$ with $a \in \{0,1\}$

The Frobenius operator T is defined as:

$\tau[P(x,y)] = (x^2, y^2)$ with the equation $\tau^2 + 2 = (-1)^{1-a}\tau$

Applying the operator $\tau$ to a given point P on the elliptic curve E constitutes a quick operation since the work is done in the mathematical set $GF(2^n)$, n being the size of the finite field, for example n=163.

In order to facilitate the calculation of the scalar multiplication $C(x_1, y_1) = k \cdot P(x,y)$, the integer k is decomposed so as to amount to addition and subtraction operations. In this way the non-adjacent form of the integer k is defined by the NAF (from the English Non-Adjacent Form), which consists in writing an integer k in the form of a sum:

$k = \Sigma(i=0 \text{ to } 1-1) e_i 2^i$ with $e_i \in \{-1, 0, 1\}$ and $1 \approx n$.

In the case of a Koblitz elliptic curve, the NAF can be expressed by means of the Frobenius operator:

$k = \Sigma(i-0 \text{ to } 1) e_i \tau^i$.

Thus the operation of scalar multiplication of P by k amounts to applying the Frobenius operator to the point P, which is easy and rapid.

In addition, the calculation of the scalar multiplication $k \cdot P$ can be accelerated further by the precalculation and storage of a few pairs $(k_i, P_i = k_i \cdot P)$, these pairs advantageously being able to be stored in the memory of the device implementing the signature algorithm. In fact P forms part of the public parameters of the key of the signature algorithm.

For a random variable k of 163 bits, it is thus possible, by storing 42 scalar multiplication pairs $(k_i, P_i)$, to reduce the number of addition/subtraction operations to 19 instead of 52 without any precalculation.

The object of the present invention is a cryptography method on elliptic curve which makes it possible to reduce the number of additions of the scalar multiplication still further.

DESCRIPTION OF THE INVENTION

The invention relates more particularly to a cryptography method for generating probabilistic digital signatures and/or for a key exchange protocol and/or for an enciphering algorithm, the said method being based on the use of a public key algorithm on an abnormal binary elliptic curve (E) (Koblitz curve) on which a point P(x,y) is selected, pairs $(k_i, P_i)$ being stored with $P_i$ the point corresponding to the scalar multiplication of the point P by $k_i$, the said method comprising steps consisting in generating a random variable k and calculating a point C corresponding to the scalar multiplication of P by k (C=k·P), characterised in that the generation of the said random variable k and the calculation of the point C are performed simultaneously.

According to one application, the cryptographic algorithm for generating a probabilistic digital signature is the ECDSA (from the English Elliptic Curve Digital Standard Algorithm).

According to another application, the key exchange protocol cryptographic algorithm is the ECDH (from the English Elliptic Curve Diffie-Hellmann).

According to one characteristic, the method is based on the use of a Koblitz curve defined on the mathematical set $GF(2^n)$ on which a so-called Frobenius operator $\tau[P(x,y)]=(x^2,y^2)$ is available, the method being characterised in that it includes the following steps:

initialising the random variable k=0 and the point C=0,
performing a loop for j ranging from 1 to $n_{iter}$, the said loop consisting in:
  generating the following random variables at each new iteration:
    a, between 0 and n, with n the size of the finite field on which the curve is defined,
    u {−1,1},
    i between 0 and t, with t the number of pairs $(k_i,P_i)$ stored,
  calculating the point $C_j=C_{j-1}+u\cdot\tau^a\cdot P_i$,
  generating the random variable $k_j=k_{j-1}+u\cdot k_i\cdot\tau^a$
converting k into an integer at the end of the loop,
simultaneously presenting the random variable k and the point C=k·P.

According to one characteristic, the number t of pairs $(k_i,P_i)$ stored is between 35 and 45.

According to another characteristic, the number of iterations of the loop ($n_{iter}$) is fixed at between 10 and 12.

According to another characteristic, the size of the mathematical field n on which the Koblitz curve is defined is equal to 163.

The invention also relates to a secure device of the smart card type, or a calculation device of the computer type provided with enciphering software, having an electrical component able to implement the signature method according to the invention.

The method according to the invention has the advantage of reducing the time taken for calculating the scalar product of P and k, which constitutes an essential step in the use of a cryptography method on elliptic curve, firstly by generating the random variable k simultaneously with the calculation of the scalar product k·P and secondly by reducing the number of addition operations by the precalculation of pairs $k_i$, $P_i=k_i\cdot P$.

The particularities and advantages of the invention will emerge more clearly from a reading of the following description made with reference to the ECDSA algorithm and given by way of illustrative and non-limiting example. The method according to the invention can in fact also be applied to a key exchange protocol or to an enciphering algorithm for example.

Let E be a Koblitz elliptic curve defined on the set $GF(2^n)$, with n=163 the size of the mathematical field on which the work is being carried out, and let P(x,y) be a given point on this curve.

The Frobenius operator $\tau[P(x,y)]=(x^2,y^2)$ is then available and constitutes a quick operation given the field $GF(2^n)$ on which the work is being carried out.

Firstly a certain number of pairs $(k_i, P_i=k\cdot P)$ are calculated, which are stored in the component implementing the signature method (a smart card microcontroller for example) The number of pairs is fixed at t between 35 and 45, which constitutes a compromise between the memory space occupied and the required acceleration for the signature generation calculation method.

The method according to the present invention consists in accelerating the method for generating a probabilistic signature by using precalculated and stored pairs $(k_i,P_i)$ generating the random variable k at the same time as calculating the point C=k·P.

Firstly the values of C and k are initialised to 0.

Then a loop on j of $n_{iter}$ iterations is implemented, which performs the following operations:

generating the following random variables at each new iteration of j:
  r, between 0 and n,
  u {−1,1},
  i between 0 and t,
  calculation of $C_j=C_{j-1}+u\cdot\tau^r\cdot P_i$
  calculation of $k_j=k_{j-1}+u\cdot k_i\cdot\tau^r$ Then there is obtained, at the output from the loop, the random variable k, which is converted into an integer, and the point C corresponding to the scalar multiplication of P by k.

The signature (r,s) is then generated according to the conventional procedure of the ECDSA, or of another algorithm using Koblitz elliptic curves, with the values of k and C defined according to the method of the invention.

The generation of k simultaneously with the calculation of the point C accelerates the signature generation method, in particular by reducing the number of additions necessary for calculating the scalar multiplication of P by k. The number of additions for calculating the point C is in fact $n_{iter}-1$.

According to the degree of security and the performance required, $n_{iter}$ is fixed at between 10 and 12 iterations.

Thus, with k an integer of 163 bits and by storing approximately 40 pairs $(k_i,P_i)$, it is possible to calculate the scalar multiplication k·P by performing only 9 to 11 addition operations.

The invention claimed is:

1. A cryptography method applicable to at least one of the generation of probabilistic digital signatures, a key exchange protocol, and an enciphering algorithm, said method being based on the use of a public key algorithm on an abnormal binary elliptic curve on which a point P(x,y) is selected, with pairs $(k_i,P_i)$ being stored where $P_i$ is the point corresponding to the scalar multiplication of the point P by $k_i$, further including the use of a Koblitz curve defined on the mathematical set $GF(2^n)$ on which a Frobenius operator $\tau[P(x,y)]=(x^2,y^2)$ is available, the method including the following steps:

initialising the random variable $k=0$ and the point $C=0$, performing a loop for j ranging from 1 to $n_{iter}$, said loop comprising:

generating the following random variables at each new iteration of j:

a, between 0 and n, with n the size of the finite field on which the curve is defined, $U \{-1,1\}$, i between 0 and t, with t the number of pairs $(k_i,P_i)$ that are stored, calculating the point $C_j=C_{j-1}+u\cdot\tau^a\cdot P_i$ generating the random variable $k_j=k_{j-1}+u\cdot k_i\tau^a$ converting k into an integer at the end of the loop, and simultaneously presenting the random variable k and the point $C=k\cdot P$, wherein the cryptography method is implemented in a cryptographic algorithm according to an elliptic curve.

2. A method according to claim 1, wherein said method is employed in a cryptographic algorithm for generating a probabilistic digital signature according to the Elliptic Curve Digital Standard Algorithm.

3. A method according to claim 1, wherein said method is employed in a key exchange protocol cryptography algorithm according to Elliptic Curve Diffie-Hellmann.

4. A method according to claim 1, wherein the number of stored pairs $(k_i,P_i)$ is between 35 and 45.

5. A method according to claim 1, wherein the number of iterations of the loop $(n_{iter})$ is between 10 and 12.

6. A method according to claim 1, wherein the size of the mathematical field n on which the Koblitz curve is defined is equal to 163.

7. A secure device, of the smart card type, including an electronic component that implements a signature method applicable to at least one of the generation of probabilistic digital signatures, a key exchange protocol, and an enciphering algorithm, said method being based on the use of a public key algorithm on an abnormal binary elliptic curve on which a point $P(x,y)$ is selected, with pairs $(k_i,P_i)$ being stored where $P_i$ is the point corresponding to the scalar multiplication of the point P by $k_i$, said method comprising the steps of establishing initial values for a random variable k and a point C corresponding to the scalar multiplication of P by k $(C=k\cdot P)$, generating successive values for said random variable k and the point C during a plurality of iterations, wherein the successive values of k and C that are generated during each iteration are based upon the values for k and C, respectively, that were obtained during the previous iteration, and presenting final values for k and C simultaneously upon compeletion of the last iteration, and wherein the cryptography method is implemented in a cryptographic algorithm according to an elliptic curve.

8. A calculation device of the computer type provided with enciphering software, and including an electronic component that implements a signature method applicable to at least one of the generation of probabilistic digital signatures, a key exchange protocol, and an enciphering algorithm, said method being based on the use of a public key algorithm on an abnormal binary elliptic curve on which a point $P(x,y)$ is selected, with pairs $(k_i,P_i)$ being stored where $P_i$ is the point corresponding to the scalar multiplication of the point P by $k_i$, said method comprising the steps of establishing initial values for a random variable k and a point C corresponding to the scalar multiplication of P by k $(C=k\cdot P)$, generating successive values for said random variable k and the point C during a plurality of iterations, wherein the successive values of k and C that are generated during each iteration are based upon the values for k and C, respectively, that were obtained during the previous iteration, and presenting final values for k and C simultaneously upon completion of the last iteration, and wherein the cryptography method is implemented in a cryptographic algorithm according to an elliptic curve.

9. A cryptography method applicable to at least one of the generation of probabilistic digital signatures, a key exchange protocol, and an enciphering algorithm, said method being based on the use of a public key algorithm on an abnormal binary elliptic curve on which a point $P(x,y)$ is selected, with pairs $(k_i,P_i)$ being stored where $P_i$ is the point corresponding to the scalar multiplication of the point P by $k_i$, said method comprising the steps of selecting one of said stored pairs $(k_i, P_i)$, and generating a random variable k and calculating a point C corresponding to the scalar multiplication of P by k $(C=k\cdot P)$ by multiplying each of the selected values for $k_i$ and $P_i$ by a Frobenius operator $\tau[P(x,y)]=(x^2, y^2)$, wherein the cryptography method is implemented in a cryptographic algorithm according to an elliptic curve.

10. The method of claim 9, wherein said selecting, generating and calculating steps are performed for a plurality of iterations, and during each iteration the products of the Frobenius operator with the selected values are respectively added to the values for the random variable k and the point C that were obtained in the previous iteration.

11. The method according to claim 9, wherein said method is employed in a cryptographic algorithm for generating a probabilistic digital signature according to the Elliptic Curve Digital Standard Algorithm.

12. The method according to claim 9, wherein said method is employed in a key exchange protocol cryptography algorithm according to Elliptic Curve Diffie-Hellmann.

13. The method according to claim 10, wherein the number of iterations is between 10 and 12.

14. The method according to claim 9, wherein the number of stored pairs $(k_i,P_i)$ is between 35 and 45.

15. A secure device, of the smart card type, including an electronic component that implements a signature method applicable to at least one of the generation of probabilistic digital signatures, a key exchange protocol, and an enciphering algorithm, said method being based on the use of a public key algorithm on an abnormal binary elliptic curve on which a point $P(x,y)$ is selected, with pairs $(k_i,P_i)$ being stored where $P_i$ is the point corresponding to the scalar multiplication of the point P by $k_i$, said method comprising the steps of selecting one of said stored pairs $(k_i, P_i)$, and generating a random variable k and calculating a point C corresponding to the scalar multiplication of P by k $(C=k\cdot P)$ by multiplying each of the selected values for $k_i$ and $P_i$ by a Frobenius operator $\tau[P(x,y)]=(x^2, y^2)$, wherein the cryptography method is implemented in a cryptographic algorithm according to an elliptic curve.

16. A calculation device of the computer type provided with enciphering software, and including an electronic component that implements a signature method applicable to at least one of the generation of probabilistic digital signatures, a key exchange protocol, and an enciphering algorithm, said method being based on the use of a public key algorithm on an abnormal binary elliptic curve on which a point $P(x,y)$ is selected, with pairs $(k_i,P_i)$ being stored where $P_i$ is the point corresponding to the scalar multiplication of the point P by $k_i$, said method comprising the steps of selecting one of said stored pairs $(k_i, P_i)$, and generating a random variable k and calculating a point C corresponding to the scalar multiplication of P by k (C=k·P) by multiplying each of the selected values for $k_i$ and $P_i$ by a Frobenius operator $\tau[P(x,y)]=(x^2, y^2)$, wherein the cryptography method is implemented in a cryptographic algorithm according to an elliptic curve.

17. A cryptography method applicable to at least one of the generation of probabilistic digital signatures, a key exchange protocol, and an enciphering algorithm, said method being based on the use of a public key algorithm on an abnormal binary elliptic curve on which a point P(x,y) is selected, with pairs $(k_i,P_i)$ being stored where $P_i$ is the point corresponding to the scalar multiplication of the point P by $k_i$, said method comprising the steps of establishing initial values for a random variable k and a point C corresponding to the scalar multiplication of P by k (C=k·P), generating successive values for said random variable k and the point C during a plurality of iterations, wherein the successive values of k and C that are generated during each iteration are based upon the values for k and C, respectively, that were obtained during the previous iteration, and presenting first values for k and C simultaneously upon completion of the last iteration, and wherein the cryptography method is implemented in a cryptographic algorithm according to an elliptic curve.

18. The method according to claim 17, wherein said method is employed in a cryptographic algorithm for generating a probabilistic digital signature according to the Elliptic Curve Digital Standard Algorithm.

19. The method according to claim 17, wherein said method is employed in a key exchange protocol cryptography algorithm according to Elliptic Curve Diffie-Hellmann.

* * * * *